(12) United States Patent
Cockeram et al.

(10) Patent No.: US 6,586,704 B1
(45) Date of Patent: Jul. 1, 2003

(54) JOINING OF MATERIALS USING LASER HEATING

(75) Inventors: Brian V. Cockeram, North Huntingdon, PA (US); Trevor G. Hicks, West Mifflin, PA (US); Glenn C. Schmid, Bethel Park, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/854,551

(22) Filed: May 15, 2001

(51) Int. Cl.[7] .............................................. B23K 26/00

(52) U.S. Cl. .............................. 219/121.64; 219/121.85

(58) Field of Search ....................... 219/121.64, 121.85, 219/121.63; 148/525

(56) References Cited

U.S. PATENT DOCUMENTS

| | | | | |
|---|---|---|---|---|
| 2,857,663 | A | 10/1958 | Beggs ........................ | 29/473.1 |
| 4,624,403 | A | 11/1986 | Kohon et al. ................ | 228/122 |
| 5,125,557 | A | 6/1992 | Tanaka et al. ............... | 228/121 |
| 5,211,776 | A * | 5/1993 | Weiman ...................... | 148/525 |
| 5,503,703 | A * | 4/1996 | Dahotre et al. ........... | 156/272.8 |
| 5,599,468 | A | 2/1997 | Mako et al. ............ | 219/121.14 |

* cited by examiner

Primary Examiner—M. Alexandra Elve
(74) Attorney, Agent, or Firm—Richard A. Morgan; Paul A. Gottlieb

(57) ABSTRACT

A method for diffusion bonding ceramic layers such as boron carbide, zirconium carbide, or silicon carbide uses a defocused laser beam to heat and to join ceramics with the use of a thin metal foil insert. The metal foil preferably is rhenium, molybdenum or titanium. The rapid, intense heating of the ceramic/metal/ceramic sandwiches using the defocused laser beam results in diffusive conversion of the refractory metal foil into the ceramic and in turn creates a strong bond therein.

18 Claims, 1 Drawing Sheet

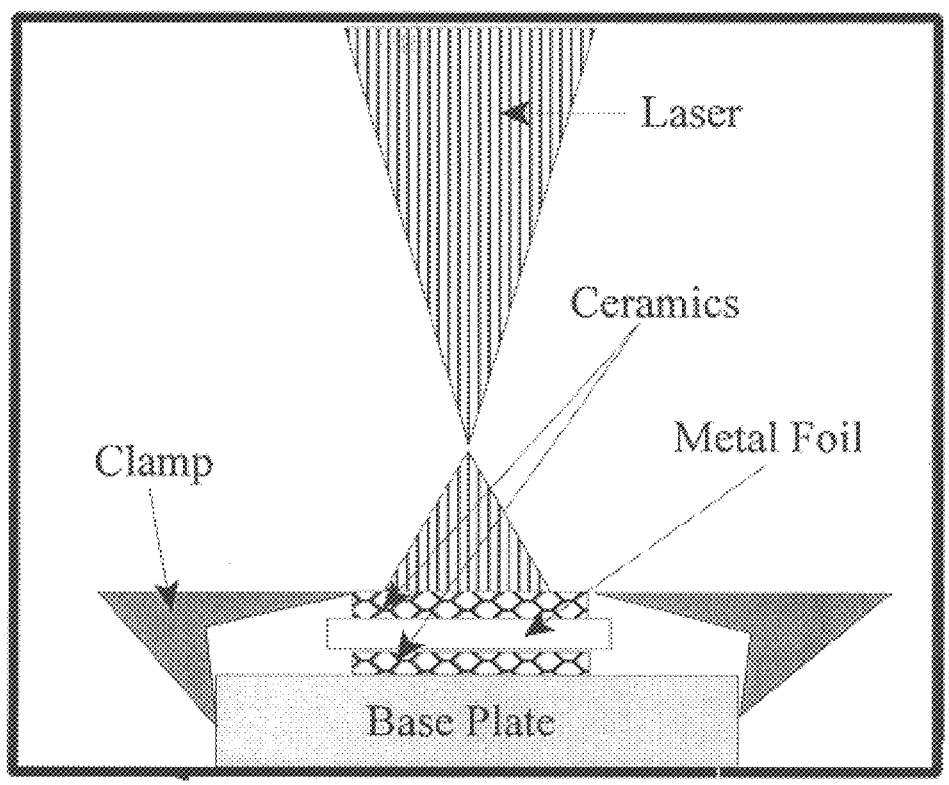
Figure 1: Reaction Vessel for Diffusion Bonding of Ceramics

JOINING OF MATERIALS USING LASER HEATING

CONTRACTUAL ORIGIN OF THE INVENTION

The United States Government has rights in this invention pursuant to a contract with the U.S. Department of Energy.

FIELD OF THE INVENTION

The invention is an improved method for diffusion bonding of SiC ceramics.

BACKGROUND OF THE INVENTION

The diffusion bonding of a metal foil layer between two ceramic layers (such as SiC (silicon carbide), or ZrC (zirconium carbide) or $B_4C$ (boron carbide)) has an established history. Unfortunately, conventional metal diffusion bonding, which uses vacuum hot pressing, results in numerous difficulties. A five hour heat treatment in a vacuum (pressure less than $1 \times 10^6$ torr) at temperatures of 1200° C. to 1500° C. and applied pressure of 500 to 2,000 psi is required to produce bonding. The equipment needed for conventional vacuum hot pressing is expensive to purchase and expensive to operate. Also, conventional metal foil diffusion of this type is a single unit manufacturing that is slow, not conducive to mass production, and hence prohibitively costly.

The use of metal foils to achieve diffusion bonding between ceramics, or a ceramic and a metal, is disclosed in U.S. Pat. No. 2,857,663. Oxide ceramics such as $Al_2O_3$ are disclosed, and diffusion bonding is effected by melting the metal foil insert. U.S. Pat. No. 4,624,403 discloses the use of various metal foils to bond SiC ceramics upon application of pressure and temperature in a vacuum or inert atmosphere. Unlike the '663 process, which melts the foil, the '403 process promotes diffusion bonding without melting the metal foil. The process of U.S. Pat. No. 5,125,557 also uses an inert or vacuum atmosphere furnace to bond ceramics with various metals. U.S. Pat. No. 5,599,468 describes the use of a pulsed electron radiation heat source to join ceramics such as SiC to SiC or other metals by the use of metal foil inserts.

Accordingly, a need remains for a process for diffusion bonding metal foils or other metal inserts between ceramic layers in a process suitable for mass production of less expensive, higher quality products than those resulting from single unit production.

SUMMARY OF THE INVENTION

In order to meet this need, the present method uses a defocused laser to heat and to join ceramics with the use of a thin metal foil insert. The rapid, intense heating of the ceramic/metal/ceramic sandwiches using the defocused laser beam results in diffusive conversion of the refractory metal foil into a ceramic and in turn creates a strong bond therein. Most preferably, the foils are rhenium or molybdenum. The foil thickness can be 12–100 $\mu$m, most preferably between about 12 and 25 $\mu$m. The process is ordinarily conducted in a glove box containing an inert atmosphere, preferably argon (with less than 1 part per million each of oxygen, nitrogen and moisture).

BRIEF DESCRIPTION OF THE DRAWINGS

FIG. 1 is a schematic diagram identifying the juxtaposition of the clamped ceramic/metal/ceramic sandwich to the laser.

DETAILED DESCRIPTION OF THE INVENTION

Ceramic/metal/ceramic constructs are diffusion bonded, according to the invention, using a defocused laser. FIG. 1 is a schematic diagram, which illustrates that, within an inert atmosphere in a "glove box" known in the art, a defocused laser beams into a ceramic/metal/ceramic sandwich clamped to a base plate. The heat of the laser joins the sandwich layers without appreciable melting of the metal, to create a diffusion bond. Most preferably, the foil(s) are rhenium or molybdenum between about 12 and 25 $\mu$m in thickness. The process is conducted in a glove box containing a purified inert atmosphere, preferably argon (with less than 1 part per million each of oxygen, nitrogen and moisture).

Many varieties of ceramics may be bonded according to the present method, including but not limited to silicon carbide (SiC), zirconium carbide (ZrC), or boron carbide ($B_4C$).

Likewise, a variety of metal layers, or thin metal foils, may be used, most preferably molybdenum and rhenium and in some cases titanium. Thicknesses of the ceramic layers are generally on the order of 0.060 to 0.125 inches ($1.5$–$3.2 \times 10^3$ $\mu$m), more preferably 0.100 inches ($2.5 \times 10^3$ $\mu$m) The metal foils for the diffusion bonding ceramic layers of these thicknesses are 12–100 $\mu$m, most preferably about 12–25 $\mu$m in thickness.

Prior to bonding, the ceramic layers are rinsed and etched, such as by using successive treatments with acetone, ultrasonic cleaning in aqueous alcohol, rinsing in deionized water, etching in acid (such as 50% aqueous hydrofluoric acid) and rinsing in acetone and ethanol. A sandwich of the selected ceramic/metal/ceramic layers is then tightly clamped to a base plate (see FIG. 1).

The clamped sandwich is placed in an associated glove box with an inert atmosphere that contains the laser beam. The defocused laser beam produces intense heating of the ceramic layers, which in turn cause diffusive bonding of the ceramic layers with the metal foil. The method uses conventional clamps and is suitable for use not only in manufacturing but also for on-site repairs.

The temperature of pieces that are being laser heated is measured by touching the outer edge of the piece with a thermocouple. As a result, the temperature of the ceramic during the bonding process can be nominally determined by the average power output of the laser beam, spot size and type of material. The power output of the laser beam can be changed by parameters such as pulse energy, pulse length and pulse frequency in the case of pulsed Nd:YAG lasers. Continuous wave Nd:YAG lasers or $CO_2$ lasers could also be used for this process. Table 1, below, provides the temperature of SiC, $B_4C$ and ZrC ceramics measured with a thermocouple upon treatment with pulsed Nd:YAG laser beams with varied laser power (85–1,080 watts).

TABLE 1

| Laser Power | Temperature [° C.] | | |
|---|---|---|---|
| [Watts] | SiC | $B_4C$ | ZrC |
| 85 | 330 | 315 | 110 |
| 260 | 640 | 680 | 720 |
| 585 | 1000 | 1220 | 870 |
| 800 | 1200 | 1500 | 1080 |
| 925 | 1320 | 1585 | 1400 |

TABLE 1-continued

| Laser Power | Temperature [° C.] | | |
|---|---|---|---|
| [Watts] | SiC | B₄C | ZrC |
| 1035 | 1490 | 1645 | 1460 |
| 1080 | 1763 | — | 1480 |

Ideally, slow heating and cooling are used, so that maximum defocused laser power is exerted for about 15 to 60 minutes for a total bonding time of about 2–4 hours, more preferably, 2.8–3.5 hours. The laser beam may be tilted 10°, ventilation provided to the glove box and the laser housing head itself covered with aluminum foil or other reflective substance to prevent beam reflections from overheating the laser optics. Sample power levels, temperatures and laser times to ramp-up, hold, and ramp-down are shown in Table 2. "Coupon" to the SiC-reactive metal foil-SiC sandwich sample being treated.

TABLE 2

| Power Level [Watts] | Temperature of Coupon [° C.] | Laser Time on Coupon [minutes] |
|---|---|---|
| 10 | 70 | 9 |
| 35 | 132 | 9 |
| 85 | 327 | 9 |
| 175 | 550 | 9 |
| 260 | 640 | 10 |
| 570 | 1000 | 10 |
| 690 | 1252 | 10 |
| 810 | 1418 | 10 |
| 910 | 1575 | 15 to 60 |
| 810 | 1428 | 10 |
| 690 | 1252 | 10 |
| 570 | 1000 | 10 |
| 260 | 640 | 10 |
| 175 | 550 | 9 |
| 86 | 330 | 9 |
| 35 | 132 | 9 |
| 10 | 70 | 9 |

Typical laser parameters used to produce the above results are shown in Table 3.

TABLE 3

| | |
|---|---|
| Test Coupon Size | 0.5" × 0.5" × 1/8" |
| Material to be bonded | SiC |
| Reactive Metal Foil Inserts | Molybdenum, Rhenium or Titanium |
| Laser | Rofin-Sinar 1000 W Pulsed Nd:YAG; housing head covered with aluminum foil |
| Average Laser Power | 10 to 1080 Watts |
| Laser Pulse Energy | 2 to 6 Joules |
| Laser Spot Size | 0.5" diameter |
| Lens Focal Length | 250 mm |
| Length from the Lens to the Coupon Surface | 13 inches |
| Tilt of Laser Housing Head | 10° |
| Pulse Length | 1.0 ms |
| Power | 20% |
| Pump Energy | 3.3% |
| Phase Shift | 0 ms |
| Pulse Frequency | 5 to 210 Hz |
| Dwell Time | 2.78 to 3.53 Hours |
| Glove Box Atmosphere | Argon with less than 1 ppm oxygen, nitrogen or moisture each |

Although the invention has been described above, the following examples are illustrative.

EXAMPLE 1

Fourteen sandwich bonds containing 25 μm rhenium foil and SiC ceramic, and seven sandwich bonds with 100 μm rhenium foil and SiC ceramic, were treated with a defocused Nd:YAG laser at various average laser power wattages (W) including 570 W, 690 W, 810 W, 910 W, and 1050 W. All wattages resulted in strong bonding. The most desirable microstructure and reproducible bonds were produced with a maximum heating power of 910 W for between 15 and 60 minutes, with the ceramic reaching 1575° C. (see Table 2 comment). The bond microstructure produced by the process was similar to that produced by vacuum heat press processes. Microhardness measurements from the bond region also showed that the hardness of the bond region were similar to bonds produced by vacuum heat press processes.

EXAMPLE 2

SiC/rhenium/SiC sandwich bonds produced with 25 μm and 100 μm thick foil by defocused Nd:YAG laser treatment at 910 W for thirty minutes in an inert atmosphere were machined into double-notched specimens and were shear tested according to ASTM C 1292. The shear strength values of the sandwich bonds produced with 25 μm rhenium foil (2,280 to 1,680 psi) were lower than the values for the bonds produced with 100 μm rhenium foils (5,250 to 1,410 psi). Although the average strength values for the samples produced with 100 μm foil were slightly higher than for the samples produced with 25 μm thick foil, the data scatter for the 100 μm foil bonds was higher.

Although the invention has been described above with reference to specific materials and methods, the invention is only to be considered to be limited in accordance with the following claims.

We claim:

1. A method of diffusion bonding of ceramics by inserting a rhenium metal foil between two ceramic layers to create a sandwich construct, clamping said sandwich construct, and subjecting at least one surface of said sandwich construct to a defocused laser beam.

2. The method according to claim 1 wherein said ceramic layers are selected from the group consisting of SiC, B₄C and ZrC.

3. The method according to claim 1 wherein said ceramic layers have a thickness between about 0.060 and 0.125 inches.

4. The method according to claim 1 wherein said metal foil has a thickness between about 12 and 100 μm.

5. The method according to claim 1 wherein said metal foil has a thickness between about 12 and 25 μm.

6. The method according to claim 5 wherein average laser power is between about 10 and 1080 watts.

7. The method according to claim 6 wherein average laser power is between about 800 and 1000 watts.

8. The method according to claim 7 wherein the sandwich construct is exposed to said defocused laser beam for 15–60 minutes.

9. The method according to claim 1 wherein said diffusion bonding takes place in an inert atmosphere.

10. The method according to claim 1 wherein said diffusion bonding takes place in an atmosphere comprising primarily argon, with less than one part per million (ppm) each of oxygen, nitrogen, and moisture.

11. The method according to claim 4 wherein said diffusion bonding takes place in an inert atmosphere.

12. The method according to claim 4 wherein said diffusion bonding takes place in an atmosphere comprising primarily argon, with less than one part per million (ppm) each of oxygen, nitrogen, and moisture.

13. The method according to claim 5 wherein said diffusion bonding takes place in an inert atmosphere.

14. The method according to claim 5 wherein said diffusion bonding takes place in an atmosphere comprising primarily argon, with less than one part per million (ppm) each of oxygen, nitrogen, and moisture.

15. The method according to claim 6 wherein said diffusion bonding takes place in an atmosphere comprising primarily argon, with less than one part per million (ppm) each of oxygen, nitrogen, and moisture.

16. The method according to claim 7 wherein said diffusion bonding takes place in an inert atmosphere.

17. The method according to claim 7 wherein said diffusion bonding takes place in an atmosphere comprising primarily argon, with less than one part per million (ppm) each of oxygen, nitrogen, and moisture.

18. The product prepared in accordance with claim 17.

* * * * *